US007809118B2

(12) United States Patent
Saleh et al.

(10) Patent No.: US 7,809,118 B2
(45) Date of Patent: Oct. 5, 2010

(54) SYSTEM AND METHOD FOR VOICE AND DATA CONVERGENCE

(75) Inventors: Nayel Saleh, Round Lake, IL (US); Michael Peters, Downers Grove, IL (US)

(73) Assignee: Aspect Software, Inc., Lombard, IL (US)

( * ) Notice: Subject to any disclaimer, the term of this patent is extended or adjusted under 35 U.S.C. 154(b) by 1135 days.

(21) Appl. No.: 10/901,930

(22) Filed: Jul. 29, 2004

(65) Prior Publication Data

US 2006/0023867 A1 Feb. 2, 2006

(51) Int. Cl.
*H04M 11/00* (2006.01)
*H04M 3/00* (2006.01)

(52) U.S. Cl. ............................. 379/88.14; 379/265.02; 379/265.09

(58) Field of Classification Search ............ 379/265.09, 379/265.02, 88.14
See application file for complete search history.

(56) References Cited

U.S. PATENT DOCUMENTS

| | | | |
|---|---|---|---|
| 5,555,179 A | 9/1996 | Koyama et al. | |
| 5,765,033 A | 6/1998 | Miloslavsky | |
| 5,926,539 A | 7/1999 | Shtivelman | |
| 5,946,387 A | 8/1999 | Miloslavsky | |
| 5,953,332 A | 9/1999 | Miloslavsky | |
| 5,953,405 A | 9/1999 | Miloslavsky | |
| 6,002,760 A | 12/1999 | Gisby | |
| 6,021,428 A | 2/2000 | Miloslavsky | |
| 6,044,145 A | 3/2000 | Kelly et al. | |
| 6,044,368 A | 3/2000 | Powers | |
| 6,067,357 A | 5/2000 | Kishinsky et al. | |
| 6,108,711 A | 8/2000 | Beck et al. | |
| 6,138,139 A | 10/2000 | Beck et al. | |
| 6,167,395 A | 12/2000 | Beck et al. | |
| 6,170,011 B1 | 1/2001 | Beck et al. | |
| 6,175,563 B1 | 1/2001 | Miloslavsky | |
| 6,175,564 B1 | 1/2001 | Miloslavsky et al. | |
| 6,185,292 B1 | 2/2001 | Miloslavsky | |
| 6,345,305 B1 | 2/2002 | Beck et al. | |
| 6,373,836 B1 | 4/2002 | Deryugin et al. | |
| 6,389,007 B1 | 5/2002 | Shenkman et al. | |
| 6,393,015 B1 | 5/2002 | Shtivelman | |
| 6,650,748 B1 * | 11/2003 | Edwards et al. ........ | 379/266.04 |
| 6,732,156 B2 | 5/2004 | Miloslavsky | |
| 7,106,836 B2 * | 9/2006 | Neuhaus .................. | 379/88.14 |
| 2006/0233338 A1 * | 10/2006 | Punaganti Venkata .. | 379/202.01 |

* cited by examiner

*Primary Examiner*—Rasha S Al Aubaidi
(74) *Attorney, Agent, or Firm*—Husch Blackwell Welsh & Katz

(57) ABSTRACT

The method and apparatus is for converting messages and responses between text messages of a user and voice responses of at least one agent in an automatic contact distribution system having a plurality of agents. In one embodiment, the method includes sending a text message in a text format from first location via a network; receiving the text message from the network at a second location; and converting the text message from a text format to a voice message in a voice format. The method further includes converting a voice response in the voice format from an agent to a text response in the text format, the voice response being in response to the text message; and sending the text response from the second location to the first location via the network. Thus, the user appears to communicate with the agent on a text basis, and the agent appears to communicate with the user on a voice basis.

16 Claims, 7 Drawing Sheets

SYSTEM AND METHOD FOR VOICE AND DATA CONVERGENCE

FIELD OF THE INVENTION

The field of the invention relates to communication systems and, in particular, to communication systems having automatic contact distributors.

BACKGROUND

Automatic contact distribution systems are known. Such systems are typically used, for example, as a means of distributing customer contacts such as telephone calls among a group of agents. Automatic contact distributors, also know as automatic call distributors, may be, but are not limited to, hardware and/or software systems with many possible configurations including distributed systems, integrated systems, systems based on one or more personal computers or servers, and the like.

Often an organization disseminates a single telephone number to its customers and to the public in general as a means of contacting the organization. The term "calls" refers not only to conventional telephone calls, but also to any customer contacts including but not limited to facsimile, e-mail, Internet communications such as web chat and VoIP (Voice Over Internet Protocol). As calls are directed to the organization from the public switch telephone network or other communication system, the automatic call distribution system directs the calls to its agents based upon some type of criteria. For example, where all agents are considered equal, the automatic call distributor may distribute the calls based upon which agent has been idle the longest. The agents that are operatively connected to the automatic call distributor may be live agents, and/or virtual agents. Typically, virtual agents are, for example, software routines and algorithms that are operatively connected and/or part of the automatic call distributor.

Automatic call distributors are often utilized in communications handling centers, such as telephone call centers, that forward incoming communications for processing by one of several associated call-handling agents. Such communications centers may be used to forward voice-over-internet protocol communications; electronic mail messages; facsimiles or the like, to associated handling agents.

Call centers, for example, are often used to dispatch emergency services, as telemarketing sales centers, as customer service centers, etc. to automatically distribute received calls. Each incoming call may have a number of handling requirements, depending on, for example, the nature of the call, the originating call area, and the language of the call. Agents, on the other hand, each have abilities to process calls having certain handling requirements. Typically, agents are able to process one or more call types. For example, agents may be trained to process certain call subject matters and certain call languages.

In known call centers, computerized automatic call distributors place incoming telephone calls, of a particular type, requiring defined skills, in queues of like calls. Appropriate agents have skills necessary to process calls in the queues, and are assigned to such queues. Agents are often assigned to multiple queues, reflective of their particular handling skills. Typically, this is done to increase the handling capacity of the center by making improved use of available communications handling resources.

Quite often, agents may handle calls related to one or more subject areas, and possess varied attributes that are relevant to all subject areas they are capable of handling. For example, a telephone call center agent may speak multiple languages, and may therefore be able to process telephone calls relating to a particular subject matter in all these languages. One simple approach used to deal with multiple agent attributes is to create and administer individual queues, each of which takes into account the subject matter and the attributes of the agent. This, however, is administratively very cumbersome.

Other known call centers use agent-skill indicators, associated with agents in order to connect calls. In such centers, a call is connected to an agent having an agent-skill indicator matching that of the call, within a group of agents. Agents, however, are typically only assignable to only one, and typically only a single agent-skill indicator is used to connect the call. Disadvantageously, such call centers do not use agent attributes across different groups. This may lead to an inefficient utilization of call center resources. Moreover, these communications handling centers do not allow for easy administration and re-assignment of agents to queues, while maintaining agent skill-sets.

One concern in designing an automatic call distributor system is ensuring that calls are efficiently routed to an agent, so as to minimize the amount of time that any particular call waits to be handled. One basic technique of minimizing on-hold time is to employ a firstin/first-out call handling technique. The first-in/first-out technique requires that calls be routed to the next available agent in the order in which the calls are received. However, in some automatic call distributor systems the agents are specialized in handling particular types of calls, so the first-in/first-out technique is not appropriate. For example in a product support department of a software facility, agents might be grouped according to specialized expertise, so that a first group is knowledgeable in word processing, a second group is knowledgeable in a database program, and a third group is knowledgeable in a spreadsheet program. Utilizing a first-in/first-out technique in such a situation is inappropriate, because a caller with a question regarding the word processing program may be routed to an agent having specialized knowledge regarding the database program or the spreadsheet program, rather than being routed to an agent with specialized knowledge in the word processing program.

The focus in the management of calls has been upon maximizing availability to customers, so as to achieve an acceptable profit margin in a competitive environment of customer service. Call management approaches that increase revenue may lead to savings for customers.

Most present-day call-distribution algorithms focus on being "fair" to callers and to agents. This fairness is reflected by the standard first-in, first-out call to most-idle-agent assignment algorithm. Skills-based routing improves upon this basic algorithm in that it allows each agent to be slotted into a number of categories based on the agent's skill types and levels.

There are times when it is not convenient for a user to speak with an agent. For example, a user may be in a meeting where he or she cannot easily place a voice phone call. Users are then forced to use a text device to communicate with the agent if a voice session was not desired. In this case, the user can establish a wireless connection using, for example, a PDA or equivalent device, and a connection would then be made into a web-based connection or web session. However, for communication with an agent, the agent must read the text, and reply by typing a response. Because a text session is created, it necessarily has the associated data delays and response time delays inherent in text sessions.

Thus there is a need in the prior art for a "pseudo-real-time" connection to be established between the user or caller and the agent even though a true real-time connection cannot be established.

SUMMARY

One embodiment of the present invention is a method for converting messages and responses between text messages of a user and voice responses of at least one agent. The method includes sending a text message in a text format from a first location via a network, receiving the text message from the network at a second location and converting the text message from a text format to a voice message in a voice format. The method further includes converting a voice response in the voice format from an agent to a text response in the text format, the voice response being in response to the text message; and sending the text response from the second location to the first location via the network. As a result, the user appears to communicate with the agent on a text basis, and the agent appears to communicate with the user on a voice basis.

BRIEF DESCRIPTION OF THE DRAWINGS

The features of the present invention, which are believed to be novel, are set forth with particularity in the appended claims. The invention may best be understood by reference to the following description taken in conjunction with the accompanying drawings, in the several figures of which like reference numerals identify like elements.

DETAILED DESCRIPTION

Figure 1:
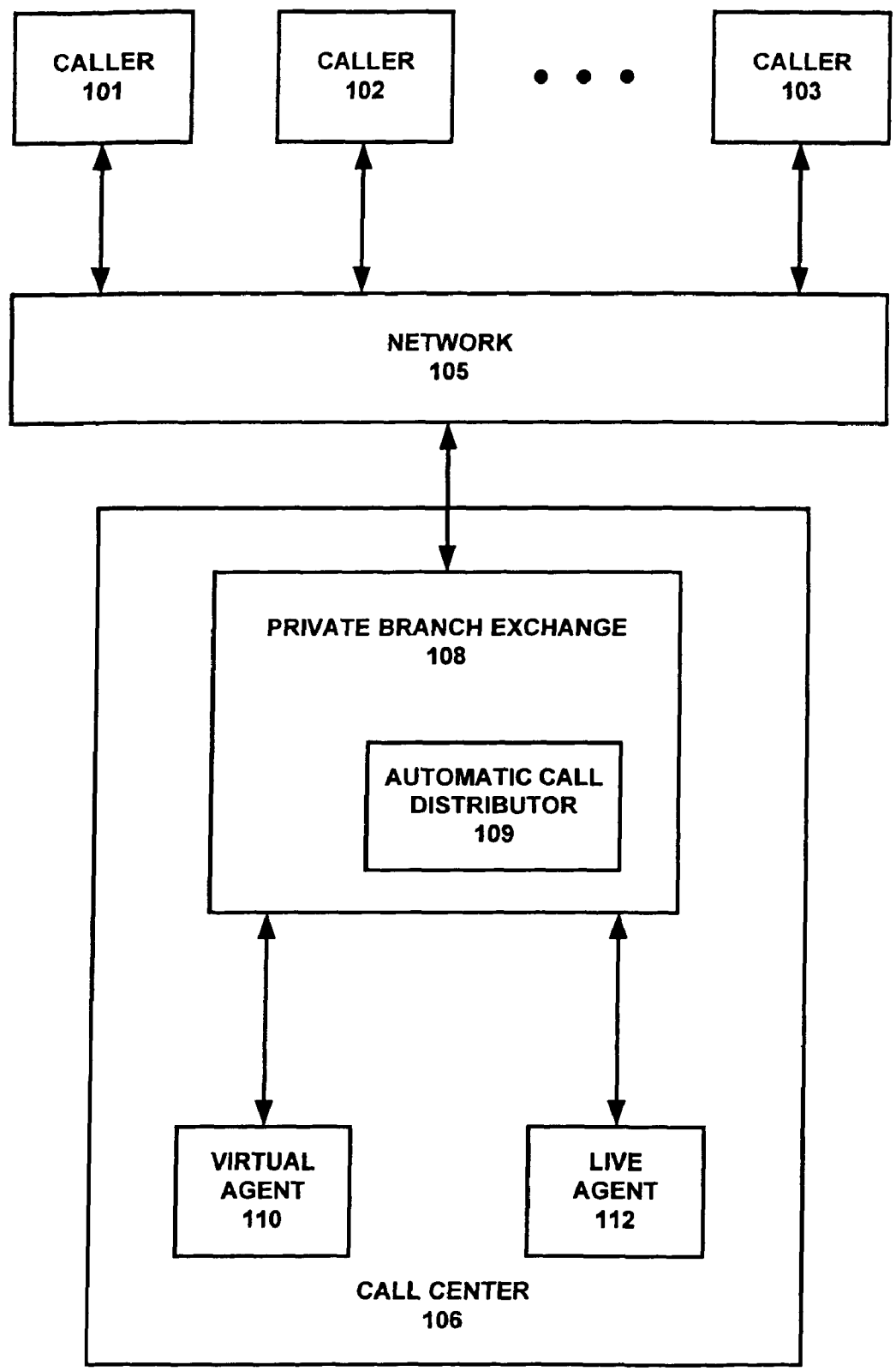
FIG. 1 is a general block diagram of one embodiment of a communication system.

While the present invention is susceptible of embodiments in various forms, there is shown in the drawings and will hereinafter be descried some exemplary and non-limiting embodiments, with the understanding that the present disclosure is to be considered an exemplification of the invention and is not intended to limit the invention to the specific embodiments illustrated. In this disclosure, the use of the disjunctive is intended to include the conjunctive. The use of the definite article or indefinite article is not intended to indicate cardinality. In particular, a reference to "the" object, "a" object or "an" object is intended to denote also one of a possible plurality of such objects.

The present system may be utilized in various network environments, as well as, systems such as automatic call distribution systems (ACD).

In some embodiments ITU-T Recommendation H.323 may be utilized as a protocol for call control in an interconnection network having network communication protocol like LAN, WAN or the Internet based on the IP networking technique. H.323 includes Q.931 protocol which is used as a call control signaling for establishing and releasing calls among terminal equipment and gateways in the internet, where the gateway is an equipment which interconnects between a call in the circuit switched network such as telephone networks, integrated services digital networks and mobile communication networks and a call in the internet. The network architecture in the H.323 includes a gatekeeper, which performs functions of address translation, access control, bandwidth management, etc. The gatekeeper may have additional functions relating to the call control such as a conference call control.

In many cases, a public switched telephone network is constructed as Intelligent Network (IN) in order to provide enhanced and diversified network service. The IN is a network connection architecture recommended in Q.1200 series of ITU-T. Difference between conventional network and the IN are two points of independence and integration of the service control function from the switching equipment.

An aim of the conventional telephone switching system is to efficiently provide one to one communication services. However, in order to provide the service control function to each switching equipment, complex addition and modification on the function are required. Therefore, advancing of services is somewhat limited. The IN solves this problem by constructing a layered structure such that the switching equipment executes a basic call connection function and a dedicated information processing equipment executes a function for providing complex services. According to the IN, a service control function needed for realization, maintenance and operation of the network services is integrated and controlling, monitoring and managing of the call control part are performed so as to meet an introduction of advanced network services. Additional services such as freephone service, abbreviated dialing service, virtual private network service and transfer service are realized with the IN technique.

In a PBX and a private communication network composed mainly with dedicated line, these additional services are realized by adding a service control function to a server equipment connected to the PBX.

When a call from an information terminal C1 of the internet to a telephone terminal T1 of the telephone network arrive, the information terminal C1 inquires to the gatekeeper and the gatekeeper responds by retrieving a gateway address AG1 for the called telephone number NT1. Therefore, the gatekeeper has an address table to take the correspondence between the telephone number and the address of the gateway used to connect to the telephone number. The routing control can be thus performed by selecting the address of nearest gateway depending upon the called telephone number informed from the calling information terminal.

Wireless communications networks offer much flexibility to the user, in that they allow users of portable communications devices, such as personal digital assistants, laptop computers, telephones, and other appliances to get connected to the public switched telephone network from any location within the region served by the wireless network. Personal communication systems are known by which a user uses an RF link to communicate with an intelligent base station, Intelligent base stations provide radio access along with an Integrated Services Digital Network (ISDN) interface to the public switched telephone network (PSTN). The PSTN aspect of the system may have three components: a personal communications switching center, where telephone central office switches have certain characteristics, a signaling transfer point, and a service control point where an intelligent data base exists maintaining certain user features and records.

Systems are also known by which a wireless communications device such as laptop computer with a cellular modem may access a packet-switched (e.g., IP) data network such as a corporate backbone network or the Internet. In some systems, a frame relay line connected to the wireless network couples the remote wireless user to the packet-switched network via an all-digital network access server. This type of network access server is occasionally known in the art as an InterWorking Unit (IWU). The network access server provides an interface to the frame relay line and wireless network and an interface (including router functionality) to the packet switched network.

The mobile device typically dial into the IP network through a network access server or otherwise register with an InterWorking Unit or gateway router/home agent in order to gain access to the IP network and communicate with a remote terminal on the network.

Figure 1A:
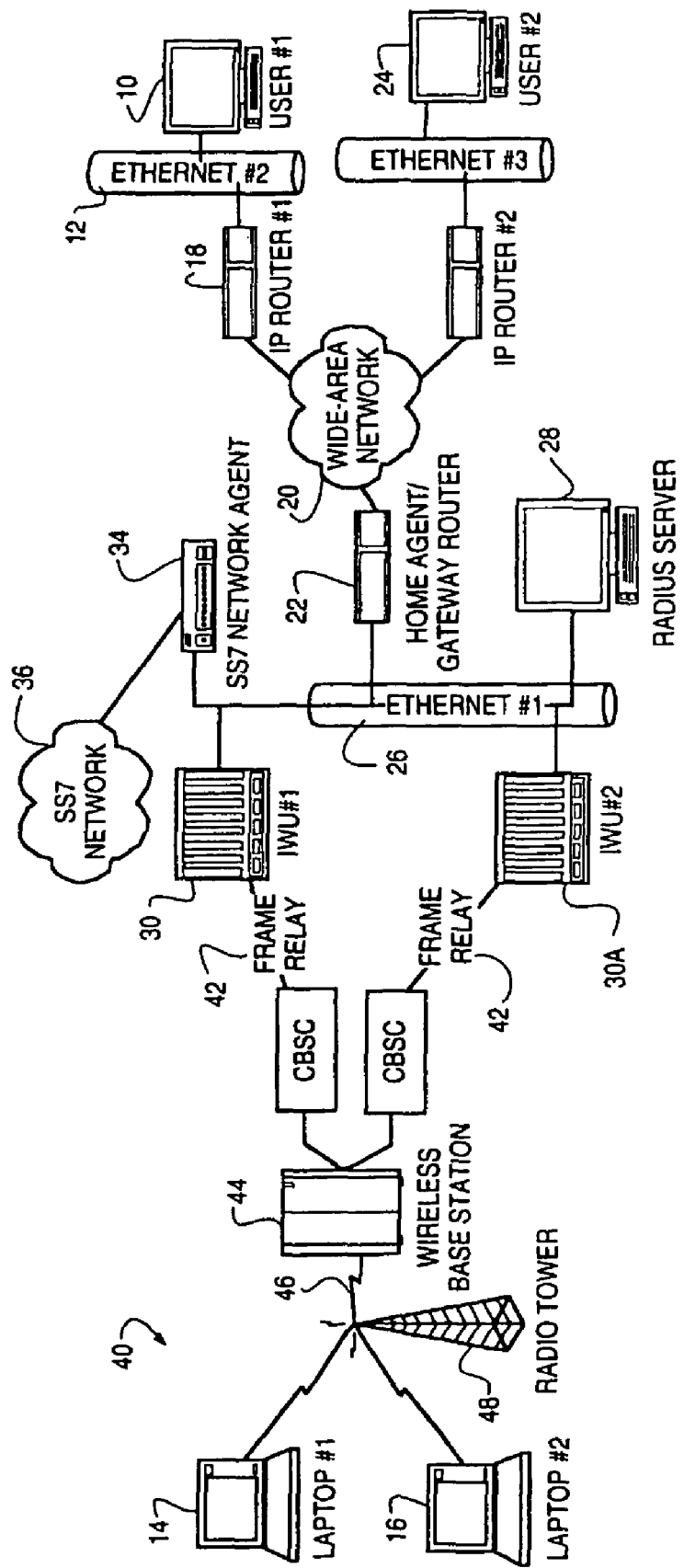
FIG. 1A is a schematic illustration of an example of a communications architecture that may be used to link a remote terminal on a packet-switched network and a user operating a mobile wireless communications device such as a laptop computer equipped with a cellular telephone modem, and in particular showing the relationship between the home agent, authentication server, a plurality of network access servers functioning as InterWorking Units that link the wireless communications network to an IP LAN and packet switched network, and Signaling System 7 network.
Figure 2:
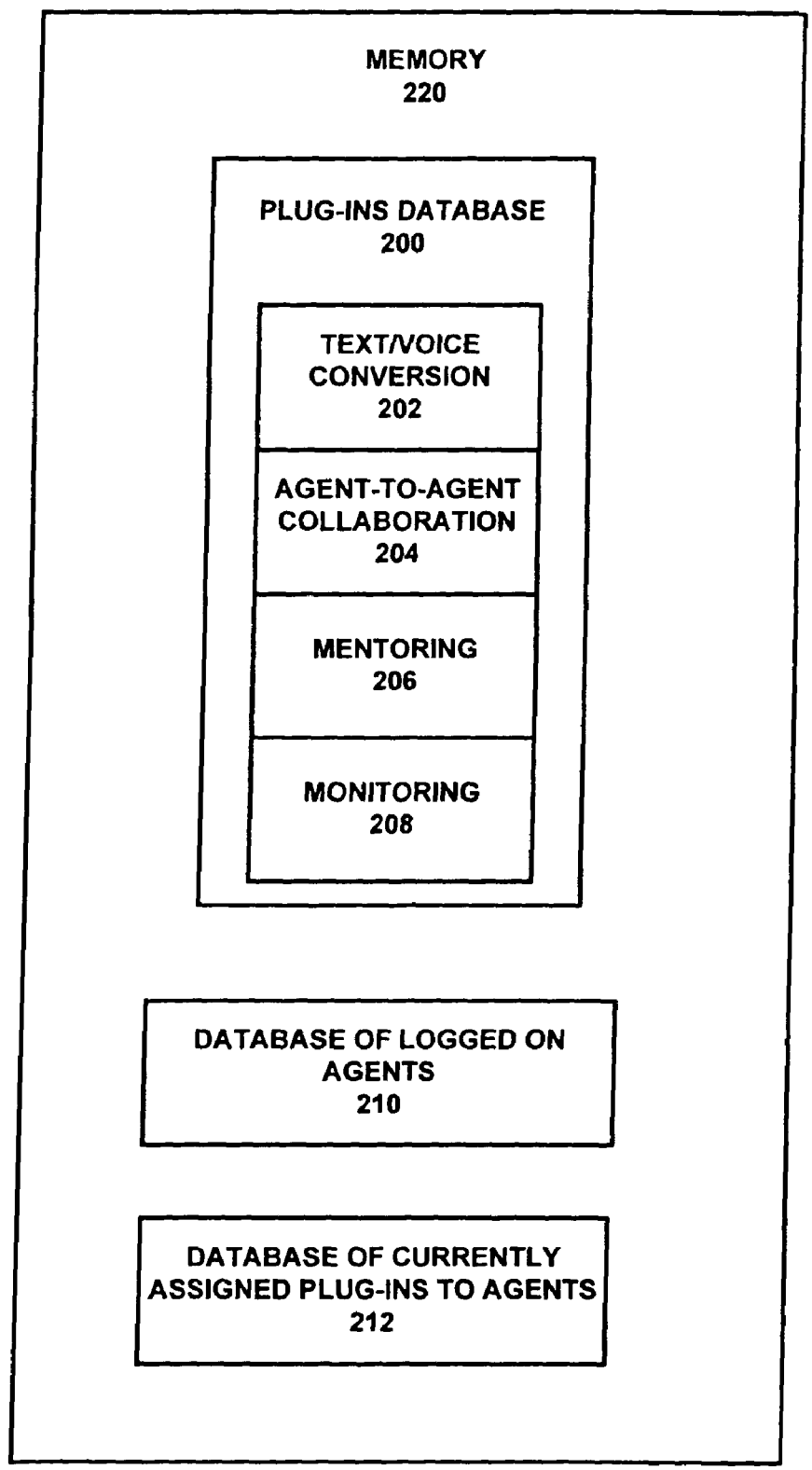
FIG. 2 is a depiction of the databases stored in memory of an embodiment of the present invention.
Figure 2A:
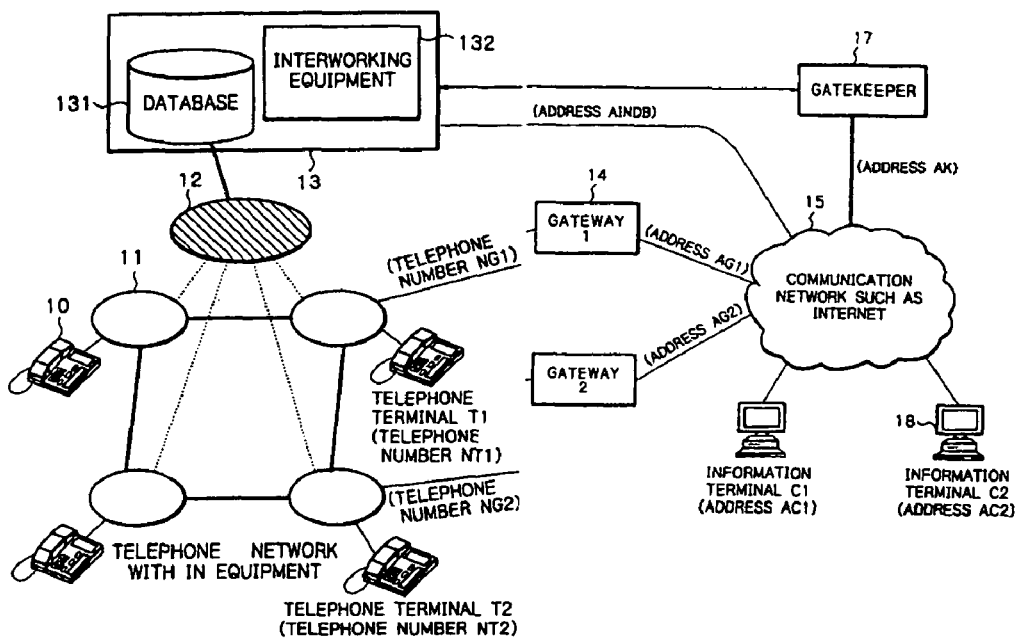
FIG. 2A is a schematic diagram of an embodiment of an interwork routing control system between a telephone network and the Internet.

FIG. 2A is a schematic diagram of an interwork routing control system between a telephone network and the Internet. FIG. 1A is a schematic illustration of the communications architecture that may be used to link a remote terminal on a packet-switched network and a user operating a mobile wireless communications device such as a laptop computer equipped with a cellular telephone modem, and in particular showing the relationship between the home agent, authentication server, a plurality of network access servers functioning as InterWorking Units that link the wireless communications network to an IP LAN and packet switched network, and Signaling System 7 network.

FIG. 2A depicts a call control part 11 for performing only basic connection of a circuit such as a digital switching system, a service control part 12 for directing the service to the call control part 11, and a service control information database 13 for storing service control information are illustrated.

A routing control communication system in the example of FIG. 2A is connected between a telephone network and the Internet. In addition to the IN facility on the telephone network, a telephone terminal T1 provided with telephone number NT1 and a telephone terminal T2 provided with telephone number NT2 are depicted. A service control information database 131 and interworking equipment 132 are both shown as in a service database equipment 13. In the Internet 15, a gatekeeper 17 is provided with address AK, an information terminal C1 is provided with an address AC1 and an information terminal C2 is provided with an address AC2. Moreover, for connecting a telephone network and the Internet, a gateway 1 having a telephone number NG1 and an address AG1, and a gateway 2 having a telephone number NG2 and an address AG2 are shown.

Referring now to FIG. 1A, a situation may occur in which a user, for example, a person operating a personal computer 10 on a corporate backbone network 12 (e.g. Ethernet), may wish to exchange information or data with one or more users of mobile wireless communications devices, such as the users operating laptop computer 14 or laptop computer 16. Similarly, the user of computer 24 may want to communicate with users operating laptop computer 14 or laptop computer 16. However, the users of the laptop computers 14 and 16, may desire to only communicate via text messages. For example, these users may be in a meeting or a conference where they cannot carry on a voice communication. Instead of the laptops 14 and 16 the users may only have text capable devices.

The wireless communications device 14 of the example of FIG. 1A is a subscriber to a wireless communications network 40. If the device 14 is authenticated and authorized to receive the IP packet (i.e., is a current, paid up subscriber to the wireless network 40 service), a search is performed with a location server for an existing mobile IP address for routing the IP packet to the device. If the searching results in a negative outcome, the device 14 is paged via the wireless communications network 40. When the device 14 responds to the page, the device becomes connected to the IP network 20/12 via a network access server or InterWorking Unit (e.g., 30) coupling the wireless communications network 40 to the IP network 20/12. Thus connected, the device 14 may receive the IP packet and initiate communication via the IP network 20/12 with the source of the IP packet, remote terminal 10.

The backbone network 12 of the example of FIG. 1A comprises an IP local area network (such as an Ethernet network), which is coupled by an IP router 18 to a wide area IP network 20 such as the Internet. When the PC 10 destined for the laptop computer 14 generates an IP packet, the IP protocol requires a destination address field in the packet corresponding to the device 14. This address field will result in the call being forwarded over the IP network 20 to a home agent 22 for the device 14. The home agent 22 comprises a gateway/router, which may be a router on the IP network 20, which acts as mechanism for coordinating the receipt and transmission of communication sessions for the device 14 from multiple remote terminals, such as terminals 10 or 24. The home agent 22 also performs these functions for a plurality of mobile wireless communications devices, such as laptop computers 14 and 16.

The network access servers 30, 30A may be coupled as shown in the example of FIG. 1A to a frame relay line 42 which is linked to a wireless base station 44 via a Central Base Station Controller (CBSC). Known and conventional additional equipment in the wireless network 40, such as mobile switching centers, may be present but are omitted from the illustration. The CBSCs multiplex a plurality of channels from multiple wireless devices on the frame relay line for transmission to the network access servers 30 and 30A. The wireless base stations transmits and receives data to and from the wireless devices via radio frequency links 46 to a radio tower 48 and radio frequency links from the tower 48 to the devices 14 and 16. The particular manner and details by which the wireless system 40 operates may be in any known manner.

The CBSC of FIG. 1A is maintained and operated by the provider of the wireless communication service for the mobile nodes 14 and 16. The CBSC multiplexes a plurality of calls (e.g., twenty three) onto an Integrated Services Digital Network Primary Rate Interface (ISDN PRI) TI line and directs the data to the network access server 30. The CBSC also initiates a page of the mobile node 14, 16 over the wireless network 40 using a mobile switching center, base station 44 and a radio tower 48. The connection between the CBSC and the network access server 30 could also use some other technology such as Asynchronous Transfer Mode (ATM).

The SS7 network agent 34 is a known device, which is connected to the SS7 network on one side and the LAN on the other side. It maps messages received from the LAN side into SS7 messages to deliver to SS7 network elements, for example, a signaling transfer point, network control point or signal control point. The SS7 network has the ability much like a RADIUS server. It can authenticate using various attributes received in SS7 signaling message to access a database and authenticate a user to access the network. It can also deliver SS7 signaling messages to the home agent 22 on the LAN. The SS7 agent 34 thus allows the SS7 network to control a data network in addition to its current role, i.e., of controlling access to the worldwide public switched telephone network.

FIG. 1 is a block diagram of a specific embodiment of a telephone system having an automatic call distributor 109 that is part of a private branch exchange 108 in a call center 106. Calls may be connected between callers 101, 102, 103 via a network 105 to an automatic call distributor 109. The automatic call distributor 109 may distribute the calls to telemarketers or agents, such as virtual agent 110, or live agent 112. The network 105 may be any appropriate communication system network such as a public switch telephone network, cellular telephone network, satellite network, land mobile radio network, the Internet, etc. Similarly, the automatic call distributor 109 may be a stand-alone unit, or may be integrated in a host computer, distributed among multiple computers, etc. The illustrated embodiment may be implemented under any of number of different formats. For example, where implemented in connection with a public switch telephone network, a satellite network, a cellular or land mobile radio network, the illustrated embodiment of FIG. 1 may operate within a host computer associated with the automatic call distributor and may receive voice information (such as pulse code modulation data) from a switched circuit connection which carries a voice between the callers 101, 102, 103 and the agents 110, 112.

An alternative embodiment, which may be implemented, for example, in connection with the Internet, may operate from within a server. Voice information may be carried between the agents 110, 112 and callers 101, 102, 103 using packets.

As shown in the embodiment of FIG. 1, a caller, such as caller 101, may place a call to the call center 106. In this embodiment the caller 101 sends a text message that is routed via the communication network 105 to the call center 106, in a conventional manner. The text message in the illustrated embodiment may be routed within the call center 106 to the private branch exchange 108 that has the automatic call distributor 109. The private branch exchange switch 108 and the automatic call distributor 109 may comprise conventional hardware and software, as modified herein to carry out the desired functions and operations.

Generally, the private branch exchange switch 108 and the automatic call distributor 109 of the embodiment of FIG. 1 form a switching system designed to receive calls and text messages destined for the call center 106, and queue them when an appropriate agent is not available. In addition, the automatic call distributor 109 distributes calls and text messages to agents or specific groups of agents according to a prearranged scheme. The automatic call distributor 109 may be integrated with the private branch exchange 108, as in the illustrative embodiment shown in FIG. 1, or provided by a separate unit.

The telephone network 105, in the illustrated embodiment of FIG. 1 may include the combination of local and long distance wire or wireless facilities and switches known as the public switched telephone network, as well as cellular network systems and the telephony feature of the Internet. The telephone network 105 may be utilized to complete calls, for example, between (i) a caller at a station set, such as callers 101, 102, 103, and the call center 106; (ii) a caller on hold and a third party; and (iii) a caller on hold and a shared-revenue telephone service, such as a 900 or 976 service, provided by content provider. As is well known, shared-revenue telephone services deliver a particular service over the telephone and subsequently bill the caller. The telephone number from which a call is made typically identifies the caller. A subsequent bill is then included as part of the caller's regular telephone bill.

The Internet network, as used herein, includes the World Wide Web (the "Web") and other systems for storing and retrieving information using the Internet or other computer network. To view a web site, the user communicates an electronic Web address, referred to as a Uniform Resource Locator ("URL"), associated with the web site. It is noted that if the caller accesses the call center 100 from a conventional telephone, the textual portions of a premium web site may be converted to speech for presentation to the caller.

Present embodiments permit a user to establish a web connection even though he or she may not be using a web-type of device. This permits a "pseudo-real-time" connection to be established between the caller and the agent even though a true real-time connection cannot be established, thus providing the caller with a connection having the "feel" of a voice session without actually establishing a voice session. Accordingly, a high bandwidth voice path need not be established, thus saving valuable system resources.

The system, for example the automatic call distributor 109 (depicted in FIG. 1), typically may have a memory 220 as depicted in FIG. 2. The memory 220 may have a plugin database 200, which may have plug-ins, such as the text/voice conversion plugin 202, as well as other plug-ins such as, agent-to-agent collaboration 204, mentoring 206, and monitoring 208. The memory 220 also has a database of agents that are logged onto the system and is referred to as a database of logged-on agents 210. Furthermore, there is a database 212 of current agent assigned plug-ins.

Figure 3:
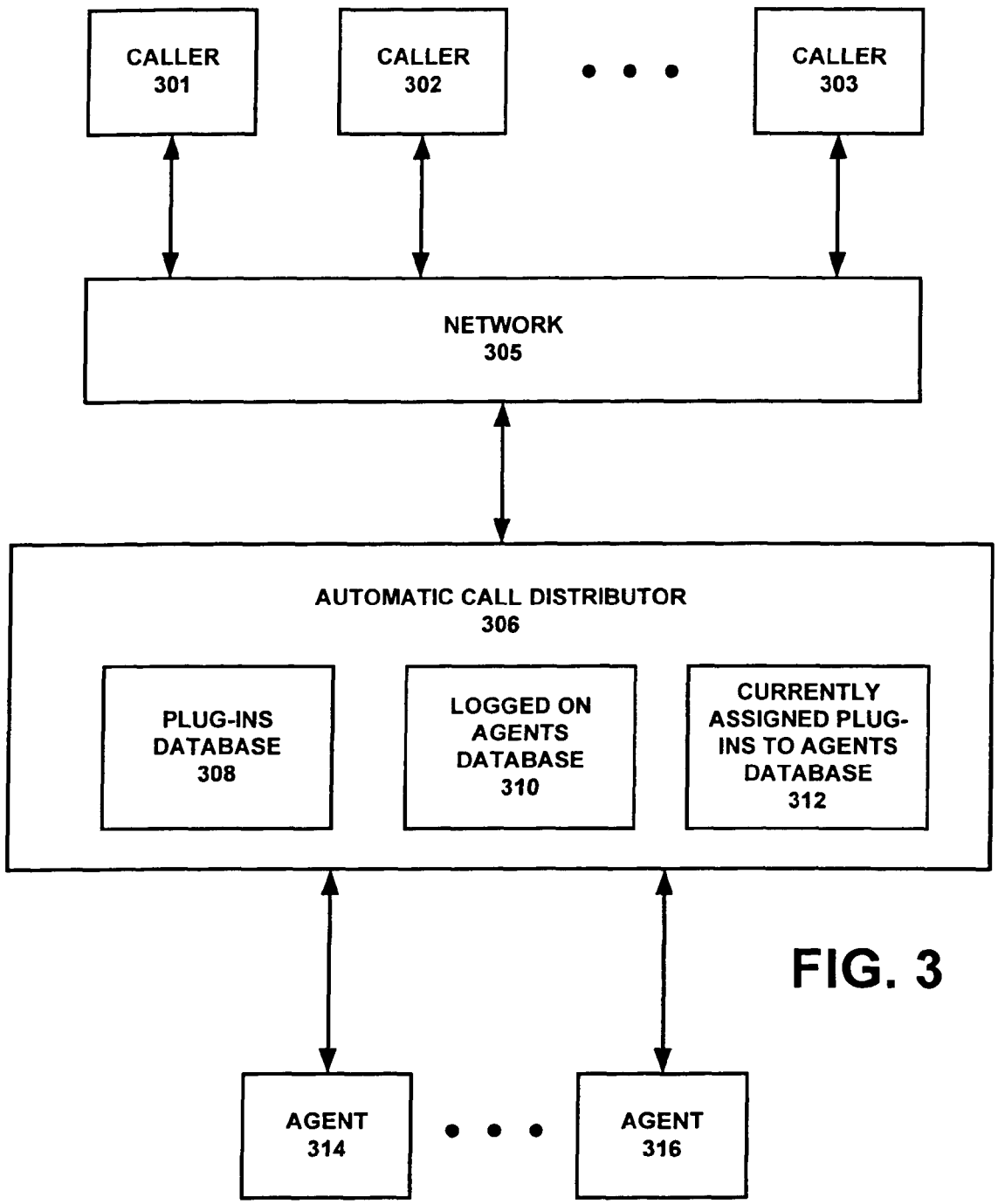
FIG. 3 is another block diagram showing more detail of an embodiment of the present invention.

In another embodiment depicted in FIG. 3, an automatic call distributor 306 connects one of the callers 301, 302, 303 via the network 305 to one of the agents 314, 316. The automatic call distributor 306 keeps track of the logged-on agents by the logged-on agents database 310. Initially, or periodically, or on an ongoing basis, agents may be assigned to the various plug-ins. This information may be stored in a currently assigned plug-in to agent database 312. In one embodiment, when one of the agents 314, 316 becomes available, that is, when the agent is not connected with a caller, the automatic call distributor 306 then accesses the plug-in database 308 and enables one of the pre-configured appropriate plugs-ins for this agent. For example, this agent may be handicapped and needs to use the format conversion plug-in 202.

The various embodiments permit a voice or data contact to establish an IP web connection so that direct agent contact can be made. In one aspect, this may be used when it is not convenient for a user to speak. For example, a user may be in a meeting where he or she cannot easily place a voice phone call. In that case, the user can establish a wireless connection using, for example, a PDA or equivalent device, and a connection would then be made into a web-based connection or web session. A synthesizer would then automatically convert the user's typed text to speech, and the voice dialog would then be presented to an agent, for example, over the IP connection. No actual voice channel need be established, thus valuable system resources are conserved. On the agent side, the verbal response of the agent would be converted to text by a speech recognition unit and the resultant text would be transmitted back to the user's PDA for textual display. In this way, the user experiences the speed and "feel" of a voice call when corresponding with the agent even though he or she cannot use voice as the communication medium.

In very general terms the method is for converting messages and responses between text messages of a user and voice responses of an agent. The method has the steps of: sending a text message in a text format from first location via a network; receiving the text message from the network at a second location; converting the text message from a text format to a voice message in a voice format; converting a voice response in the voice format from an agent to a text response in the text format, the voice response being in response to the text message; and sending the text response from the second location to the first location via the network; wherein the user appears to communicate with the agent on a text basis, and wherein the agent appears to communicate with the user on a voice basis.

Figure 4:
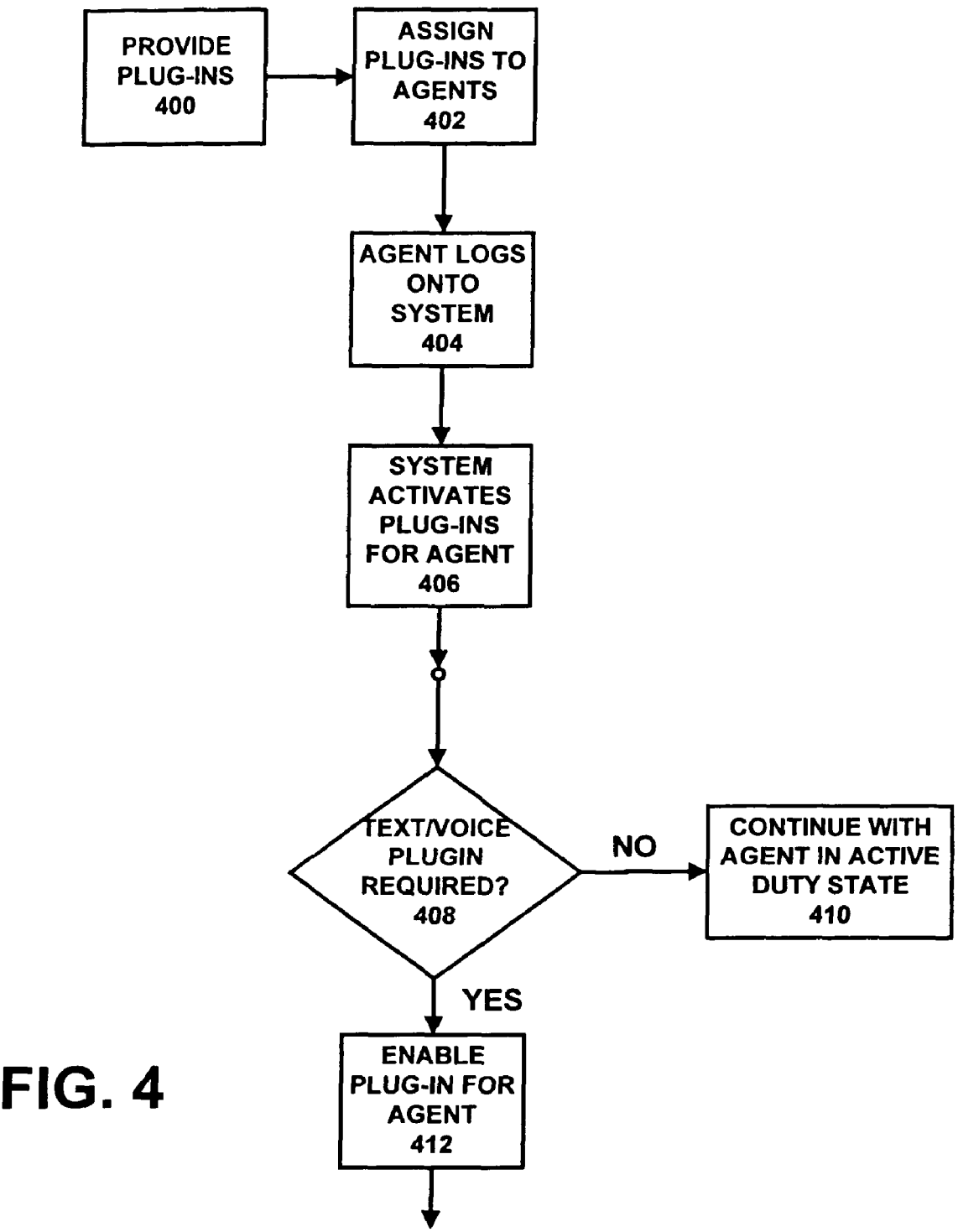
FIG. 4 is a flow diagram depicting one embodiment of a method of utilizing agents.

FIG. 4 is a flow diagram depicting one embodiment of a method of utilizing agents in which plug-ins are initially provided that implement at least one predetermined function in the call distribution system, or other communication systems as illustrated at step 400. Thereafter, the plug-ins are assigned to various agents in step 402. In step 404, the system keeps track of which agents are logged on to the system. The system activates plug-ins for an agent in step 406. Then in step 408, it is determined whether an agent requires a text/voice plugin. If not, then according to step 410, the agent continues in the active duty state. Otherwise the plug-in for this agent is enabled in step 412.

In some embodiments, the automatic call distribution system has a plurality of agents and a plurality of plug-ins. Agents are then matched and assigned to at least one plug-in. Of course, it is to be understood that not all agents need to be assigned to plug-ins in the system, and that agents may be assigned to more than one plug-in. In a further embodiment, the plug-ins may be activated for a respective agent when the respective agent logs on to the system.

Figure 5:
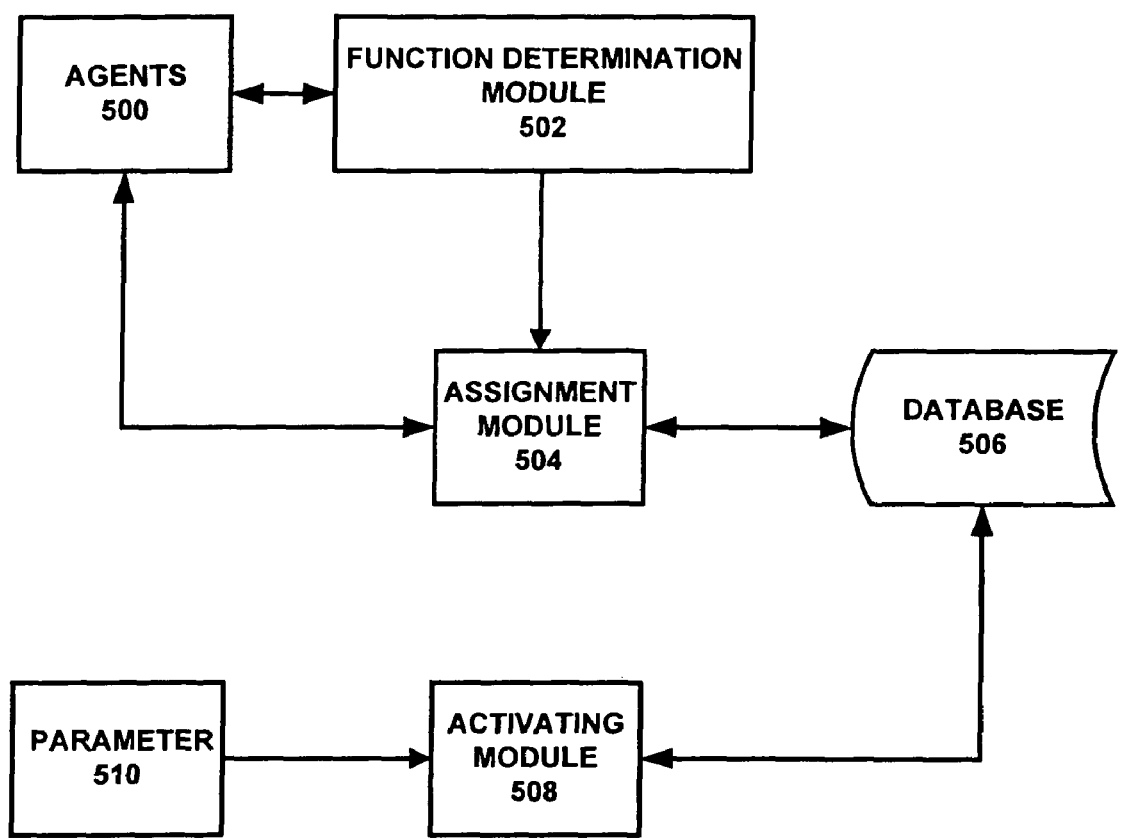
FIG. 5 is a block diagram depicting different modules in one embodiment of an exemplary call center system for utilizing agents.

FIG. 5 depicts the elements of one embodiment. A function determination module 502 determines for a plurality of agents 500 respective agent functions for respective agents. An assignment module 504 is operatively connected to the determination module 502. This assignment module 504 assigns a respective agent function to a respective agent. The assignment module 504 also stores the assigned agent functions in a storage or database 506. An activating module 508 is operatively connected to the storage or database 506 and retrieves a respective agent function from the database 506, and activates the respective agent function for a respective assigned agent in response to at least one predetermined parameter (such as identification of text/voice, see parameter 510) that occurs in the automatic call distribution system.

It is to be understood, of course, that the present invention in the various embodiments can be implemented in hardware, software, or in combinations of hardware and software.

The present invention is not limited to the particular details of the apparatus and method depicted, and other modifications and applications are contemplated. Certain other changes may be made in the above-described apparatus and method without departing from the true spirit and scope of the invention herein involved. It is intended, therefore, that the subject matter in the above depiction shall be interpreted as illustrative and not in a limiting sense.

What is claimed is:

1. A method of converting messages and responses between text messages of a user at a first location and voice responses of at least one agent in an automatic contact distribution system at a second location having a plurality of agents and a plurality of format conversion plug-ins, comprising:

assigning a respective plug-in of the plurality of plug-ins to respective selected agents of the plurality of agents and activating the respective plug-in in response to the respective selected agent logging on;

receiving a text message in a text format at the automatic contact distribution system from the user at the first location via a network;

assigning one of the selected agents to handle the text message and enabling the plug-in assigned to the assigned selected agent in response to a determination that the plug-in is required;

converting in the enabled plug-in the text message from a text format to a voice message in a voice format;

converting in the enabled plug-in a voice response in the voice format from an agent to a text response in the text format, the voice response being in response to the converted text message; and sending the text response from the second location to the first location via the network;

wherein text is sent to and received from the user such that the user appears to the user to communicate with the agent solely on a text basis, and wherein simultaneously, the agent appears to the agent to communicate with the user solely on a voice basis in substantially real time.

2. The method according to claim 1, wherein the user communicates with the agent on a web connection on a text basis, and the agent communicates with the user on a voice basis in substantially real time without establishing a high bandwidth voice channel.

3. The method according to claim 1, wherein the network is at least one of a local area network, a wide area network, and the Internet.

4. The method according to claim 1, wherein the second location is a communications system, and wherein the method further comprises:

providing at least one plug-in pre-configured for a respective agent that implements text-to-voice and voice-to-text conversion in the communications system;

assigning the at least one preconfigured plug-in to the respective agent and enabling the preconfigured plug-in for the respective agent when the respective agent becomes available; and activating the at least one preconfigured plug-in for the agent when a text message is received at the communication system.

5. The method according to claim 4, wherein the communication system has a plurality of agents and a plurality of preconfigured plug-ins, and wherein the method further comprises determining for a respective agent of the plurality of agents at least one preconfigured plug-in, which is assigned to the respective agent.

6. The method according to claim 5, wherein the method further comprises activating the preconfigured plug-in for the agent when the agent logs onto the communication system.

7. The method according to claim 4, wherein the communication system is an automatic call distribution system.

8. A method of converting messages and responses between text messages of a user at a first location and voice responses of an agent in an automatic contact distribution system at a second location, comprising the steps of:

providing a plurality of agents and a plurality of format conversion plug-ins at the second location;

assigning at least one respective format conversion plug-in to each of respective agents of the plurality of agents;

receiving a text message in a text format at the second location from the first location via a network;
selecting the respective agent from the plurality of agents to respond to the text message;
activating the respective format conversion plug-in for the respective agent;
converting the text message from a text format to a voice message in a voice format in the respective format conversion plug-in;
converting a voice response in the voice format from an agent to a text response in the text format in the respective format conversion plug-in, the voice response being in response to the converted text message; and
sending the text response from the second location to the first location via the network;
wherein the user appears to the user to communicate with the agent on a text basis, and wherein simultaneously the agent appears to the agent to communicate with the user on a voice basis.

9. The method according to claim 8, wherein the user communicates with the agent on a web connection on a text basis, and the agent communicates with the user on a voice basis in substantially real time without establishing a voice path.

10. The method according to claim 8, wherein the network is at least one of a local area network, a wide area network, and the Internet.

11. An apparatus for converting messages and responses between text messages of a user at a first location and voice responses of at least one agent in an automatic contact distribution system at a second location having a plurality of agents and a plurality of format conversion plug-ins, comprising:
means for assigning a respective plug-in of the plurality of plug-ins to respective selected agents of the plurality of agents;
means for receiving a text message in a text format at the second location from the first location via a network;
means for assigning one of the selected agents to handle the text message;
means for enabling the plug-in assigned to the assigned selected agent to convert the text message from a text format to a voice message in a voice format in real-time;
means for enabling the plug-in assigned to the assigned selected agent to convert a voice response in the voice format from the assigned selected agent to a text response in the text format, the voice response being in response to the text message; and
means for sending the text response from the second location to the first location via the network;
wherein the user appears to the user to communicate with the agent solely on a text basis, and wherein the assigned selected agent appears to the agent to communicate with the user solely on a voice basis in a pseudo-real-time connection.

12. The apparatus according to claim 11, wherein the second location is a communication system, and wherein the method further comprises providing at least one plug-in that implements text-to-voice and voice-to-text conversion in the communication system;
assigning the at least one plug-in to the agent; and
activating the at least one plug-in for the agent when a text message is received at the communication system.

13. The apparatus according to claim 12, wherein the communication system has a plurality of agents and a plurality of plug-ins, and wherein the method further comprises determining for a respective agent of the plurality of agents at least one plug-in, which is assigned to the respective agent.

14. The apparatus according to claim 12, wherein the communication system is an automatic call distribution system.

15. The apparatus according to claim 11, wherein the user communicates with the agent on a web connection on a text basis, and the agent communicates with the user on a voice basis in substantially real time without establishing a voice path.

16. The apparatus according to claim 11, wherein the network is at least one of a local area network, a wide area network, and the Internet.

* * * * *